United States Patent Office 3,817,946
Patented June 18, 1974

3,817,946
ACRYLIC RESINS CONTAINING EPOXY
FUNCTIONALITY
Buren R. Ree, Village of Afton, Minn., assignor to Minnesota Mining and Manufacturing Company, St. Paul, Minn.
No Drawing. Filed Feb. 2, 1973, Ser. No. 329,161
Int. Cl. C08d 3/02
U.S. Cl. 260—79  4 Claims

ABSTRACT OF THE DISCLOSURE

Solid, low molecular weight, storable epoxy-functional acrylic terpolymers of glycidyl methacrylate, a lower alkyl acrylate and methyl methacrylate and the process for their preparation.

SUMMARY OF THE INVENTION

This invention relates to solid, low molecular weight, storable epoxy-functional acrylic terpolymers of glycidyl methacrylate, a lower alkyl acrylate and methyl methacrylate and the process for the preparation. These terpolymers are of particular use in thermosettable powder coating formulations.

BACKGROUND OF THE INVENTION

The powder coating technique in general involves application of a finely divided organic powder to an article and the subsequent conversion of the powder through application of heat to an adherent continuous coating. It is particularly well suited to modern assembly line operation, especially when protective and/or decorative coatings are to be applied to metal articles. The organic powder is applied to the article by one of the known methods, such as the fluidized bed and electrostatic spray methods, and then heated to cause it to fuse and flow into a continuous coating on the article being coated and to subsequently become thermoset. The thermoset coatings resulting from these powders are tough, solvent resistant and weather resistant. Unless pigments, dyes or other such materials are added, they are clear and highly glossy.

Thermosetting powder coatings have certain recognized advantages, both in the coating process and in the properties of the final coating. Thus, no solvent or primer is needed, single coat coverage is possible and there is no sagging of the film. Also, there is often an improved hardness-flexibility relationship and the films have more universal chemical and solvent resistance.

Among the classes of thermosetting coating powders are those based on epoxy, polyester and acrylic systems. These may be combined and/or modified, e.g., epoxy-acrylic and polyester-acrylic systems can be used. They can also be modified with other crosslinking components such as unsaturates and aminoplasts. More extensive information relative to the thermosetting powder coating field is provided in the review entitled "Thermosetting Polyester and Acrylic Powder Coatings," D. D. Taft, R. Hong and W. J. McKillip, publication number FC 72–942 of the Society of Manufacturing Engineers, 20501 Ford Road, Dearborn, Mich. 48128.

One economically important difficulty with powder coated surfaces is an aesthetic one, i.e., their characteristic "orange peel" appearance. This is caused by their characteristic surface configuration which gives an appearance similar to that of the peeling of an orange. Agents which have been used in the past to reduce the orange peel have had the additional effect of increasing the "blocking" of the powder (i.e., the tendency of the particles to agglomerate, resulting in failure of the powder to flow freely and thereby make coating difficult or impossible). Thus, attempts to alleviate one serious problem in powder coatings has brought on another problem which has been perhaps, more serious.

THE PRESENT INVENTION

The present invention relates to a class of solid, low molecular weight, storable epoxy-functional acrylic terpolymers which have a unique combination of properties and which provide distinct advantages to powder coating compositions in which they are incorporated. Thus, they combine (1) relatively low melt viscosities resulting, on fusion, in substantial flow and continuous coatings; (2) glass transition temperatures above the temperatures of grinding and storage, providing ease of grinding to powder form and stability (freedom from blocking) in powder form; and (3) upon application of heat in the presence of particular compounding systems, conversion to tough, adherent, solvent resistant coatings. Powder coating compositions in which they are included are thus easily used and form strongly adhering, weatherable, solvent resistant coatings. The terpolymers may also be used to make thermosetting molding powders and low viscosity, high solids, solvent based enamels.

More specifically, the invention relates to terpolymers of 5–20 parts of glycidyl methacrylate units, 5–35 parts of lower alkyl acrylate units in which the alkyl group contains from 2 to 4 carbon atoms, 50–70 parts of methyl methacrylate units, and 0.5–10 parts, preferably 2–5 parts on a weight basis (1–2 parts on a molar basis) of chain terminating groups selected from

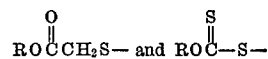

wherein each R is an alkyl group containing not more than 20 carbon atoms, the sum of the four types of units being 100 parts by weight, said terpolymers having (a) glass transition temperatures of from 20° to 70° C. (preferably from about 30° to about 50° C.)
(b) Durrans melting points of from 90° to 170° C. (preferably from about 110° to about 150° C.)
(c) melt indexes of from 1 to 30 (preferably from about 5 to about 20), when measured at a temperature of 152° C. with a piston loading of 1200 grams and an extrusion orifice of 0.0465 inch, and
(d) epoxy equivalent weights of 700–3000.

A particularly useful class of thermosetting coating powders containing the terpolymers of the invention can be defined as follows:

(1) 100 parts of the terpolymer
(2) 0–20 parts of a crosslinking agent selected from saturated aliphatic dicarboxylic acids having from 5 to 20 carbon atoms which is essentially unreactive at room temperature but which reacts rapidly above 150° C.
(3) 0–40 parts of an acid-terminated linear polyester plasticizer-curative (or plasticizer-crosslinking agent) having an equivalent weight per carboxyl group of from 100 to 1500 and
(4) 0.1 to 5 parts of a non-ionic aliphatic polyacrylate surface active agent, provided that the ratio of total carboxyl equivalence of (2) plus (3) is 0.5–1.5:1 of the epoxy equivalence of (1).

In the compositions to be used in applications in which particularly smooth coating surfaces are desired (which are free of orange peel) it is also advantageous to add, as a surface leveling agent, 1–10 parts (based on 100 parts of terpolymer) of glyceryl tris(12-hydroxystearate). This compound is a hydrogenated castor oil having an hydroxyl equivalent weight of about 185. It is a wax with a melting point of from about 84 to 87° C. and an iodine value of 3-6 and is available from the Baker Castor Oil Company of Bayonne, New Jersey under the trade designation "Castorwax". The addition of the glyceryl tris(12-hydroxystearate) to the coating powders is particularly advantageous since, unlike agents used previously to reduce orange peel, it does not appear to increase the blocking tendency of the powder.

The useful combination of properties of the terpolymers depends upon the relative amounts as well as upon the nature of the recurring groups. A level of glycidyl methacrylate lower than 5 percent (by weight of the monomer charge) results in a polymer which cannot be converted to a high strength, thermoset state and levels of glycidyl methacrylate above 20 percent result in both the loss of desired properties (e.g. having too high a cross-link density and reduced flexibility) and in increased costs. More than 35 percent of the alkyl acrylate component (which is preferably ethyl acrylate) causes the polymers to block readily in powder form (i.e. agglomerate and refuse to flow evenly) while less than 5 percent of this component brings about excessive brittleness. The methyl methacrylate, making up the balance of the terpolymer, provides weatherability and retention of gloss and is therefore present to the greatest extent consistent with the retention of the other properties required for the processing and ultimate use of the coatings.

Preferably the terpolymers containing from 10 to 15 parts of glycidyl methacrylate, 20 to 25 parts of the lower alkyl acrylate and 60 to 65 parts of methyl methacrylate. The lower alkyl acrylate is ordinarily ethyl acrylate.

The glass transition temperature is that temperature range at which an amorphous polymer changes from a brittle glassy state to a flexible rubbery state. This has been characterized in the terpolymers herein by the temperatures at which the material exhibits a discontinuous change in heat capacity as measured by differential thermal analysis. The melting point measurements herein were made by the Durrans mercury method and the melt index measurements were made according to ASTM-D1238 at a temperature of 152° C., a piston loading of 1200 grams and an extrusion orifice of 0.0465 inch.

The terpolymers are prepared by agitating in an inert atmosphere (1) an aqueous medium containing a suspending aid,
(2) a monomer charge of 5-20 parts of glycidyl methacrylate, 5-35 parts of a lower alkyl acrylate in which the alkyl group contains from 2 to 4 carbon atoms and 50-70 parts of methyl methacrylate,
(3) 0.5-10 parts of a chain transfer agent of the formula

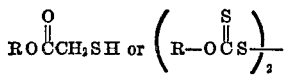

wherein each R is an alkyl group containing not more than 20 carbon atoms, and
(4) 0.05-5 parts of a free radical initiator, at from 60 to 90° C. for not less than two hours.

Thus, the preparation of the polymers is carried out in the absence of a solvent for the polymer by a suspension polymerization technique. Preferably, a mixture of the monomers, the chain transfer agent and the initiator is added to a heated, stirred, aqueous solution of the suspending agent under an inert (e.g. nitrogen) atmosphere. After the addition is complete, the agitation and heating are maintained for not less than two hours and ordinarily for not more than 10 hours. The polymer is recovered by cooling the mixture, filtering, washing and drying. The resulting product is free-flowing polymer beads, suitable for subsequent processing. Alternatively, the initiator may be suspended in the aqueous phase and the monomer mixture added in small increments. This process results in the preparation of a relatively low molecular weight terpolymer with substantially complete conversion of the monomers charged to polymer. The suspension polymerization technique of this process avoids the substantial loss of low molecular weight components of polymer (often characteristic of the isolation step in solution polymerizations which involve the precipitation of the polymer from solution by means of a non-solvent).

The retention in the product of the low molecular weight components, furthermore, is advantageous in that it aids in the thermal flow of the polymer in the fusion step of the powder coating operation.

As noted previously, the terpolymers have a melt index within a particular range. In order to control this, and the molecular weight of the polymer, particular chain transfer agents are used, i.e. compounds of the formulae

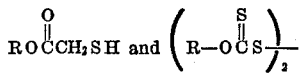

wherein each R is an alkyl group containing not more than 20 carbon atoms. These particular classes of chain transfer agents have been found to be particularly useful since they not only control the molecular weight (and hence the melt index) of the resulting polymer to the desired degree but also they do not inhibit the complete conversion of monomers to polymer. When commonly used chain transfer agents, such as lauryl or dodecyl mercaptan, are used at sufficient levels to produce a polymer having the desired melt index, a product with an unacceptable amount of residual monomer is produced. To reduce the amount of monomer in the product to an acceptable level, up to 10 percent by weight of initiator may be required. In the practice of the present process, however, using the preferred chain transfer agent, relatively low levels of initiator are sufficient for substantially 100 percent conversion of monomers to polymer.

Preferably in the chain transfer agents of the type

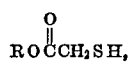

R is isooctyl. Such compounds in which R contains fewer than five carbon atoms are less effective and those in which R contains more than eleven carbon atoms appear to be deleterious of suspension stability. In the chain transfer agents of the type

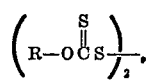

R is preferably R'CH$_2$— wherein R' is hydrogen or an alkyl group bonded to the CH$_2$— through a tertiary carbon atom (e.g. R' is tert-butyl). The reason for this is that polymers made using chain transfer agents of the second type,

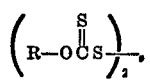

in which R is a group bearing hydrogen on the β carbon atom are thermally unstable.

Suitable free radical initiators for use in the process of the invention are, for example, peresters, acyl peroxides, and azo compounds. Specifically these include benzoyl peroxide, lauroyl peroxide, t-butyl perbenzoate, t-butyl peroxypivalate, dibenzyl peroxydicarbonate, diisopropyl peroxydicarbonate and azobis isobutyronitrile, ultraviolet light or ionizing radiation.

Either ionic suspending aids, such as poly(sodium acrylate) or poly(ammonium acrylate) or non-ionic aids such as poly(vinyl alcohols) are suitable.

The crosslinking agents and plasticizer-curatives (i.e. plasticizer-crosslinking agents) used in the thermosetting coating powders are polycarboxylic (preferably dicarboxylic) or anhydride (preferably monoanhydride) type materials, ordinarily selected from the polycarboxylic acids and anhydrides themselves and acid-terminated polyesters thereof. The ratio of the total carboxyl equivalency of these materials (constituents (2) and (3) of the coating powders) to the epoxy equivalence the terpolymer is 0.5–1.5:1.

Each anhydride group is considered to be equivalent to two carboxyl groups with respect to this ratio. The polycarboxylic acids and anhydrides can be aliphatic (e.g. alkanoic) or aromatic in nature and ordinarily contain from five to twenty carbon atoms.

The acid-terminated polyesters are useful for introducing flexibility into the cured coatings (plasticizing them) and for preventing chipping and flaking of the coatings, due to their longer chains. It is frequently preferred to utilize a mixture of crosslinking agents and plasticizer-curatives, ordinarily one of each. A particularly preferred crosslinking-plasticizing system is 0–20 parts of an acid terminated butanediol adipate having an acid equivalent weight of 500–1000 combined with an alkanoic dicarboxylic acid containing from five to twenty carbon atoms, so that the ratio of the total carboxylic acid equivalence is 0.9–1.1:1 of the epoxy equivalence of the terpolymer.

The surface active agents provide good substrate wetting. When no surface active agent is present, the molten coating often does not wet the substrate surface sufficiently to give an optimum uniform coating and small imperfections (pocks) form in which the coating is very thin. These pocks are effectively eliminated by adding 0.1–5 parts, preferably 0.2–1.5 parts, based on 100 parts of terpolymer, of a non-ionic aliphatic poly acrylate surface active agent. This can be an aliphatic polyacrylate, such as poly(2-ethylhexylacrylate).

Although the powder coating compositions can be used without catalysts, it is preferred that a catalyst be included to facilitate the crosslinking reaction and thus enhance the solvent resistance and abrasion resistance of the resulting coating. The higher rate of reaction brought about by the catalyst is also an advantage. The catalysts are advantageously used in amounts varying from about 0.05–2 parts (based on 100 parts of terpolymer). They are of the types which promote the acid-epoxy crosslinking reaction and/or promote the epoxy-epoxy polyetherification crosslinking reaction. The amount of catalyst used will vary with the specific crosslinking agent and its concentration as well as the specific time and temperatures used in the sintering-thermosetting coating process. The catalysts which are used do not significantly enhance the rate of reaction at room temperature (that is to say they are latent at that temperature) but become active at particular selected higher temperatures. The catalysts that are latent up to at least 50° C. are preferred. Catalysts for the epoxy-carboxylic reaction are useful in the coating powders of the invention provided, most preferably, that they can be incorporated into the powder without causing blocking over a period of six months at 50° C., and provided further that they do not cause foaming during the curing cycle.

Useful catalysts include heavy metal salts of organic acids (ordinarily those containing from 2 to 22 carbon atoms) such as stannous carboxylic acid salts including stannous octoate and stannous stearate, tertiary or quaternary amines and their halides, such as trimethylbenzylammonium chloride and 2-methylimidazole. A preferred catalyst for a dicarboxylic acid crosslinked system is 0.08–0.5 parts of stannous stearate per 100 parts of terpolymer. This small amount of catalyst improves the flexibility, impact resistance and solvent resistance.

Additionally, up to about 60 percent by weight of the coating powder of one or more additives such as pigments, dyes, fillers (inorganic or organic), metallic flakes, ultraviolet absorbers, etc. can be added to the powders. Thus, fillers or extender such as mica, silica, calcium carbonate, barytes, etc. can be used to increase the hardness and/or reduce the costs of the finished products. Pigments or dyes, such as phthalocyanine bue, titanium dioxide, chromium oxide, carbon black, and the acrylamide yellows or oranges, etc. may be incorporated into the coating powders for the purpose of coloring or opacifying the resulting coatings. Metallic flakes such as aluminum may be incorporated into the coating powders to lend decorative effects to the resultant coatings.

The thermosettable coating powders are prepared by dissolving or thoroughly dispersing all of the constituents in a suitable solvent. These include ketones, esters, aromatic hydrocarbons, chlorinated hydrocarbons and ethers, which are readily removed by distillation. Among the preferred solvents are acetone, ethyl acetate, benzene, tetrahydrofuran and methylene chloride. Once the constituents are thoroughly mixed, the solvent is evaporated under vacuum, leaving a solid cake which is crushed into a fine powder. Alternatively, the coating powder can be prepared by mixing the powdered constituents together and homogenizing the mixture by processing it through a mixing extruder or on a two roll mill and grinding to less than 150 micron particle size powder.

The following examples are given for the purpose of further illustrating the present invention, but are not intended, in any way, to be limiting on the scope thereof. All temperatures herein are given in degrees Centigrade and the parts are expressed by weight.

TERPOLYMER PREPARATION

Example 1

A mixture of 62.4 parts (423 grams) of methyl methacrylate, 24.0 parts (163 grams) of ethyl acrylate, 13.6 parts (92 grams) of glycidyl methacrylate, 3.9 parts (26.5 grams) of isooctyl mercaptoacetate

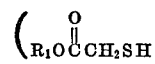

wherein $R_1$ is isooctyl) and 3.5 parts (23.6 grams) of benzoyl peroxide was added with stirring to 250 parts (1700 grams) of 0.1 percent aqueous poly(sodium acrylate) at 60° under a nitrogen atmosphere. The mixture was stirred for five hours at 60° then cooled, filtered, washed and dried.

The resulting polymer had a melt index of 5.3, a melting point of 134° and a glass transition temperature, $T_g$, of 28°. The epoxy equivalent weight was found to be 1199 as compared to a calculated value of 1127.

Example 2

To 225 parts of a stirred 0.1 percent aqueous solution of poly(sodium acrylate) at a temperature of 68° was added a mixture composed of 62 parts of methyl methacrylate, 24 parts of ethyl acrylate, 14 parts of glycidyl methacrylate, 3.9 parts of isooctyl mercaptoacetate and 3.5 parts of benzoyl peroxide. The reaction temperature dropped to 60° and was held there, with stirring for five hours. The mixture was cooled and filtered, the solids washed with water and dried to give 93 percent of the theoretical amount of polymer beads with a melt index of 2.2, a melting point of 154°, an epoxy equivalent weight of 1262 and a glass transition temperature of 41°.

Example 3

The polymerization was carried out as in Example 2 except that the benzoyl peroxide was suspended in the aqueous phase at 60°, the mixture of monomers and isooctyl mercaptoacetate added, and the polymerization carried out at 77°. The product had a melt index of 3.8, a melting point of 142° C., an epoxy equivalent weight of 1240 and a glass transition temperature of 46°.

Examples 4–7

Four additional polymer lots according to the invention were prepared using the procedure of Example 1. The first three (Examples 4–6) were run in 300 gallon kettles, utilizing 700 pound monomer charges and the fourth (Example 7) was run in a 50 gallon kettle utilizing a 115 pound monomer charge. The physical properties of the resulting polymers were as follows:

| Example No. | Melting point, °C. | Melt index | $T_g$, °C. | Epoxy equivalent weight |
|---|---|---|---|---|
| 4 | 139 | 1.5 | 42 | 1,197 |
| 5 | 124 | 10.1 | 37 | 1,188 |
| 6 | 132 | 6.5 | 36 | 1,190 |
| 7 | 107 | 23.3 | 34 | 1,165 |

Examples 8–17

These polymers of the invention were prepared using the procedure of Example 1. The first table below provides details of the individual charges and the second indicates the reaction conditions and the physical properties of the resulting polymer.

The abbreviations used are as follows:

Monomers
 MMA (methyl methacrylate)
 EA (ethyl acrylate)
 GMA (glycidyl methacrylate)
Suspending Agents
 PVA poly(vinyl alcohol)
 P(NaA) poly(sodium acrylate)
Chain Transfer Agents
 IOM (isooctyl mercaptoacetate)

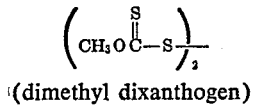

(dimethyl dixanthogen)

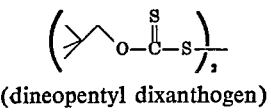

(dineopentyl dixanthogen)

nBuM (n-butyl mercaptoacetate)
 Dodec M (dodecyl mercaptoacetate)
Free Radical Initiators
 BPO (benzoyl peroxide)
 AIBN (azobisisobutyronitrile)

THE THERMOSETTING COATING POWDER FORMULATIONS

Example 19

The following were blended on a six inch two roll rubber mill:

| | |
|---|---|
| Terpolymer of Example 3 | 100 |
| Poly 2-ethyl hexyl acrylate (Modaflow, available from Monsanto) | 1.5 |
| Butanediol adipate (1) | 10.7 |
| Glyceryl tris (12-hydroxy stearate) (2) | 3.25 |
| Titanium dioxide pigment | 48.1 |
| Black pigment | 0.42 |
| Stannous stearate | 0.084 |
| Sebacic acid | 7.2 |

(1) Acid terminated butanediol adipate with an acid equivalent weight of 815.

(2) Available from The Baker Castor Oil Co., Bayonne, N.J. under the trade designation "Castorwax."

The terpolymer and the surface active agent were banded on the rolls of the mill with one roll heated at 135° C. and the other roll cooled with cold water. The heat was then reduced to 38° C. and the remaining components added in approximately the order listed. Once intimately blended (after 15 minutes), the material was removed from the mill as a sheet, cooled and ground in a micropulverizer grinder containing a number 20 screen and the resulting powder was screened with a U.S. Standard No. 230 screen. The portion which passed through the 230 mesh screen was then electrostatically sprayed at room temperature onto a metal test panel (surface treated cold rolled 20 gauge steel panel with a zinc phosphate surface treatment designated Bonderite 40 and available from the Parker Co. Detroit, Mich.) and the coated panel was cured 20 minutes at 177° C. in a forced air oven.

The resulting gray colored coating was superior to known acrylic powder coatings in gloss, lack of orange peel, flexibility and weathering. It also passed an MEK

| Ex. No. | Monomers, parts | | | Aqueous phase Suspension agent and concentration[1] | Parts | Chain transfer agent Agent | Parts | Free radical initiator Initiator | Parts | Durrans M.P., °C. | Melt index | $T_g$, °C. | Epoxy equivalent weight | Time and temperature of polymerization Hours | Degrees |
|---|---|---|---|---|---|---|---|---|---|---|---|---|---|---|---|
| | MMA | EA | GMA | | | | | | | | | | | | |
| 8 | 67 | 19 | 14 | 0.2% PVA | 250 | IOM | 4.9 | AIBN | 0.16 | 130 | 5.2 | 49 | 1,105 | 4 | 80 |
| 9 | 59 | 34 | 7 | 0.1% P(NaA) | 350 | IOM | 3.0 | BPO | 1.4 | 123 | 10.2 | 33 | 2,205 | 2 / 2 | 80 / 90 |
| 10 | 52 | 28 | 20 | 0.1% P(NaA) | 330 | IOM | 2.4 | BPO | 1.1 | 135 | 1.4 | 42 | 805 | 3 | 80 |
| 11 | 62 | 24 | 14 | 0.1% P(NaA) | 250 | IOM | 3.9 | BPO | 3.5 | 134 | 5.3 | 28 | 1,199 | 5 | 60 |
| 12 | 62 | 24 | 14 | 0.2% PVA | 240 | IOM | 3.9 | AIBN | 0.16 | 117 | 14.1 | 29 | 1,205 | 4 | 80 |
| 13 | 62 | 24 | 14 | 0.2% PVA | 310 | IOM | 2.9 | AIBN | 0.4 | 126 | 5.4 | 50 | 1,265 | 5 | 80 |
| 14 | 62 | 24 | 14 | 0.2% PVA | 310 | $(CH_3OC(=S)-S-)_2$ | 3.1 | BPO | 1.2 | 130 | 8.6 | | 1,362 | 2 / 3 | 80 / 90 |
| 15 | 62 | 24 | 14 | 0.2% PVA | 310 | $(\!\!\!>\!\!\!-O-C(=S)-S-)_2$ | 4.7 | BPO | 1.2 | 134 | 4.6 | | 1,250 | 2 / 3 | 80 / 90 |
| 16 | 62 | 24 | 14 | 0.1% PVA | 310 | nBuM | 2.8 | BPO | 2.3 | 143 | 2.6 | | 1,315 | 2 / 2 | 80 / 90 |
| 17 | 62 | 24 | 14 | 0.1% P(NaA) | 310 | Dodec M | 3.7 | BPO | 1.2 | 134 | 6.0 | | 1,232 | 3 / 3 | 80 / 90 |

[1] Aqueous phase described in terms of the concentration of the particular suspending agent in the aqueous phase.

EXAMPLE 18

A mixture of 62 parts of methyl methacrylate, 24 parts of ethyl acrylate, 14 parts of glycidyl methacrylate, 1.9 parts of dodecyl mercaptan and 1.6 parts of benzoyl peroxide was added with stirring to 340 parts of 0.1 percent aqueous poly(sodium acrylate) at 60° under a nitrogen atmosphere. The mixture was stirred for three hours at 80° then cooled, filtered, washed, and dried.

The resulting polymer had a melt index of 2.3, a melting point of 165° and an epoxy equivalent weight of 1189 but contained 17 percent of volatiles (residual monomer). This illustrated the disadvantage of using dodecyl mercaptan as a chain transfer agent.

rub test, resisted exposure to a 10 day salt spray test and passed a 180 degree bend test without cracking. Other colors were readily prepared by replacing the black and white pigments with pigments of other colors.

The MEK rub test consists of 30 circular wipes at light hand pressure with a pad of 50 grade cheese cloth saturated with methyl ethyl ketone. In order to pass this test the coating must not be scratched or removed, either by disappearance of the film from the steel panel or by color transfer to the pad. The salt spray test is designated ASTM B117. In the 180 degree bend test, a Q panel (a standard test panel approximately 4 by 8 inches of untreated 20 gauge cold rolled steel conforming to ASTM specification A 109) was coated to a thickness of approximately 2 mils and a corner was slowly bent 180 degrees. The bend was inspected for cracking, chipping or flaking.

Example 20

The following systems were prepared, coated and cured as in Example 19 then evaluated to demonstrate the beneficial effect of the acid terminated butanediol adipate.

|  | A | B | C | D |
|---|---|---|---|---|
| Terpolymer of Example 3 | 100 | 100 | 100 | 100 |
| Poly 2-ethyl hexyl acrylate | 1.5 | 1.5 | 1.5 | 1.5 |
| Glyceryl tris (12-hydroxy stearate) | 5.0 | 5.0 | 5.0 | 5.0 |
| Sebacic acid | 8.4 | 8.2 | 8.0 | 7.9 |
| Butanediol adipate (as in Example 19) | 0 | 1.7 | 3.3 | 5.0 |
| Black pigment | 2.3 | 2.3 | 2.3 | 2.3 |
| Stannous stearate | .084 | .084 | .084 | .084 |

The incorporation of the butanediol adipate made the coating more flexible and impact resistent. Thus, the coated panels were subjected to a 50 pound impact test (ASTM 2794-69) and assigned ratings on the following basis Rating:
1. No cracking
2. Slight cracking
3. Considerable cracking
4. Extensive cracking with flaking The panels were rated as follows:

| Formulation No.: | Rating |
|---|---|
| A | 3 |
| B | 3-4 |
| C | 2-3 |
| D | 2 |

Example 21

The systems of this example were prepared, coated and cured as in Example 19 then evaluated to demonstrate the effect of the melt index of the terpolymer on the resulting coatings.

|  | Melt index | A | B | C |
|---|---|---|---|---|
| Terpolymer of Example 4 | 1.5 | 100 |  |  |
| Terpolymer of Example 5 | 10.1 |  | 100 |  |
| Terpolymer of Example 6 | 6.5 |  |  | 100 |
| Poly 2-ethyl hexyl acrylate |  | 1.5 | 1.5 | 1.5 |
| Sebacic acid |  | 7.9 | 7.9 | 7.9 |
| Butanediol adipate (as in Example 19) |  | 10.0 | 10.0 | 10.0 |
| Glyceryl tris (12-hydroxy stearate) |  | 3.3 | 3.3 | 3.3 |
| Black pigment |  | 0.42 | 0.42 | 0.42 |
| Titanium dioxide pigment |  | 48.1 | 48.1 | 48.1 |

The coating of Lot B exhibited the least orange peel, Lot C was intermediate and Lot A the most orange peel.

Example 22

The following samples were made and evaluated in the manner described in Example 19 to demonstrate the use of diacids as crosslinking agents.

|  | A | B | C | D |
|---|---|---|---|---|
| Components: |  |  |  |  |
| Terpolymer of Example 3 | 100 | 100 | 100 | 100 |
| Poly 2-ethyl hexyl acrylate | 2.0 | 2.0 | 2.0 | 2.0 |
| Glyceryl tris (12-hydroxy stearate) | 5.0 | 5.0 | 5.0 | 5.0 |
| Dodecanedioic acid | 7.5 |  |  |  |
| Adipic acid |  | 5.17 |  |  |
| Azelaic acid |  |  | 6.67 |  |
| Sebacic acid |  |  |  | 7.17 |
| Butanediol adipate (as in Example 19) | 10.0 | 10.0 | 10.0 | 10.0 |
| Black pigment | 2.5 | 2.5 | 2.5 | 2.5 |
| Stannous stearate | .084 | .084 | .084 | .084 |
| Tests: |  |  |  |  |
| 180° bend | Pass | Pass | Pass | Pass |
| Gel time of powder (seconds) | 35 | 35 | 35 | 37 |
| Solvent rub (MEK) | Pass | Pass | Pass | Pass |

The rate and degree of cure could be controlled by the addition of catalysts such as, stannous stearate, stannous octoate and methyl imidazoles.

The bend and solvent rub tests are described hereinabove. The gel time test is run as follows: A sample of powder is placed on a surface heated to 204° C. and the time required to reach a rubbery state is determined by stirring the molten resin and determining the point at which it becomes viscous and stringy. This time is recorded as the gel time.

Example 23

A thermosetting coating powder containing only terpolymer, cross linking agent and surface active agent was prepared by dissolving 100 parts of the terpolymer of Example 2, 0.49 parts of poly 2-ethyl hexyl acrylate and 6.67 parts of adipic acid in 140 parts of tetrahydrofuran at room temperature. The tetrahydrofuran was removed using a rotary evaporator and the remaining resinous composition was pulverized and dried overnight in a vacuum at room temperature. The dried mixture was then micropulverized and screened to collect the material less than 53 m$\mu$ in size.

The powdered composition obtained was electrostatically coated onto steel panels and cured at 177° C. for 20 minutes. The resulting finish was a clear, glossy and transparent coating which was much more resistant to breaking on bend, than a similar panel cured at 177° C. for 3 minutes. This indicates the thermosetting nature of such compositions.

Example 24

The following lot demonstrates the use of a high catalyst level.

| Terpolymer of Example 2 | 100 |
|---|---|
| Poly 2-ethyl hexyl acrylate | 1.0 |
| Adipic acid | 4.3 |
| Butanediol adipate (as in Example 19) | 20 |
| Titanium dioxide pigment | 31 |
| DOBP | 2.0 |
| Stannous stearate | 1.0 |

The above powdered coating system had a gel time of 26 seconds and gave a 60 degree gloss reading of 84 when sprayed onto a test panel and cured. The 60 degree gloss test conforms to ASTM D-1471-57T.

Example 25

The following lots of thermosetting coating powders demonstrate the effects of glyceryl tris (12-hydroxystearate) in the coating powders.

| Lot | A | B |
|---|---|---|
| Terpolymer of Example 3 | 100 | 100 |
| Poly 2-ethyl hexyl acrylate | 1.5 | 1.5 |
| Butanediol adipate as in Example 19 | 10.0 | 10.0 |
| Glyceryl tris (12-hydroxy stearate) | 0 | 3.3 |
| Sebacic acid | 7.0 | 7.0 |
| Stannous stearate | 0.08 | 0.08 |
| Black pigment | 0.67 | 0.67 |
| Titanium dioqide pigment | 47.8 | 47.8 |

These systems were prepared, coated and cured as in Example 19. There was no blocking of the powder in either lot. The final coating of Lot B was much better than the comparable coating (of equal thickness) of Lot A with respect to orange peel, i.e. the coating of Lot B had much less orange peel than that of Lot A.

A particularly preferred class of terpolymers of the invention are those comprising 13-14 parts glycidyl methacrylate units, 23-24 parts of ethyl acrylate units, 59-60 parts of methyl methacrylate units and 3-4 parts of chain terminating groups of the formula

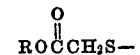

wherein R is an isooctyl group, said terpolymer having (a) a glass transition temperature of from 30° to 60° C., (b) a Durrans melting point of from 110° to 150° C.,
(c) a melt index of from 5 to 20, at a temperature of 152° C., with a piston loading of 1200 grams and an extrusion orifice of 0.0465 inch, and
(d) an epoxy equivalent weight of 1100–1300.

What is claimed is:

1. A solid, low molecular weight, storable epoxy-functional acrylic terpolymer of 5–20 parts glycidyl methacrylate units, 5–35 parts of lower alkyl acrylate units in which the alkyl group contains from two to four carbon atoms, 50–70 parts of methyl methacrylate units and 0.5–10 parts of chain terminating units selected from

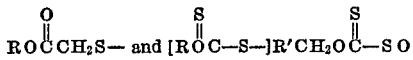

wherein R is an alkyl group containing not more than 20 carbon atoms and R' is hydrogen or an alkyl group bonded to the CH$_2$ group in the formula through a tertiary carbon atom, R' containing not more than 19 carbon atoms, the sum of the four types of units being 100 parts by weight, said terpolymer having
(a) a glass transition temperature of from 20° to 70° C.
(b) a Durrans melting point of from 90° to 170° C.
(c) a melt index of from 1 to 30, at a temperature of 152° C. with a piston loading of 1200 grams and an extrusion orifice of 0.0465 inch, and
(d) an epoxy equivalent weight of 700–3000.

2. A polymer according to claim 1 wherein the lower alkyl acrylate is ethyl acrylate.

3. A terpolymer according to claim 1 which contains 10–15 parts of glycidyl methacrylate units, 20–25 parts of lower alkyl acrylate units and 60–65 parts of methyl methacrylate units.

4. A solid, low molecular weight, storable epoxyfunctional acrylic terpolymer according to claim 1 of 13–14 parts glycidyl methacrylate units, 23–24 parts of ethyl acrylate units, 59–60 parts of methyl methacrylate units and 3–4 parts of chain terminating groups of the formula

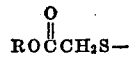

wherein R is an isooctyl group, said terpolymer having
(a) a glass transition temperature of from 30° to 60° C.,
(b) a Durrans melting point of from 110° to 150° C.,
(c) a melt index of from 5 to 20, at a temperature of 152° C., with a piston loading of 1200 grams and an extrusion orifice of 0.0465 inch, and
(d) an epoxy equivalent weight of 1100–1300.

References Cited
UNITED STATES PATENTS 3,711,451  1/1973  Csontos  260—79
3,711,452  1/1973  Csontos  260—79

MELVYN I. MARQUIS, Primary Examiner

U.S. Cl. X.R.

117—128.4; 260—31.6, 31.8 Z, 32.8 R, 33.2 R, 33.6 UA, 33.8 UA, 41 A, 41 B, 79.5 C, 79.5 NV, 89.5 A

UNITED STATES PATENT OFFICE
CERTIFICATE OF CORRECTION

Patent No. 3,817,946            Dated June 18, 1974

Inventor(s) Buren R. Ree

It is certified that error appears in the above-identified patent and that said Letters Patent are hereby corrected as shown below:

Column 3, line 57, "canbon" should be --carbon--

Column 4, line 63, "benxoyl" should be --benzoyl--

Column 5, line 41, "polyetherfi-" should be --polyetherifi- --

Column 5, line 70, "extender" should be --extenders--

Column 5, line 73, "bue" should be --blue--

Column 6 in the Table in Time and temperature of polymerization under Hours, Example No. 16, second "2" should be --3--

Column 8 in the Table in Time and temperature of polymerization under Hours, Example No. 17, first "3" should be --2--

Column 9, Example 21 in the Table, first item, "Terp9lymer" should be --Terpolymer--

Column 10, Example 25 in the Table, line 56, "Titanium dioqide pigment" should be --Titanium dioxide pigment--

Column 11, Claim 1 in the formula, "$RO\overset{O}{\overset{\|}{C}}CH_2S-$ and $[R\overset{S}{\overset{\|}{OC}}-S-]$ $R'CH_2O\overset{S}{\overset{\|}{C}}-SO$" should be --$RO\overset{O}{\overset{\|}{C}}CH_2S-$ and $R'CH_2O\overset{S}{\overset{\|}{C}}-S-$ --

Signed and sealed this 17th day of September 1974.

(SEAL)
Attest:

McCOY M. GIBSON JR.          C. MARSHALL DANN
Attesting Officer               Commissioner of Patents